Nov. 16, 1965  J. K. GALLION  3,217,812
CUTTER BLADE FOR EDGERS AND LAWNMOWERS
Filed Jan. 9, 1964
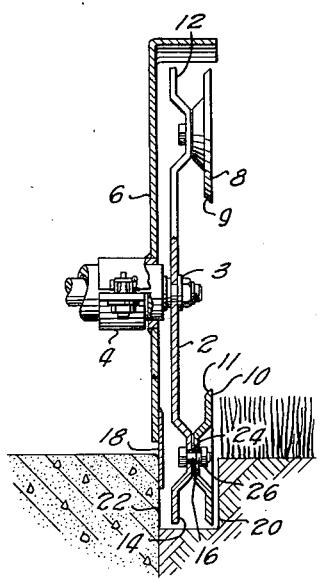
Fig.1
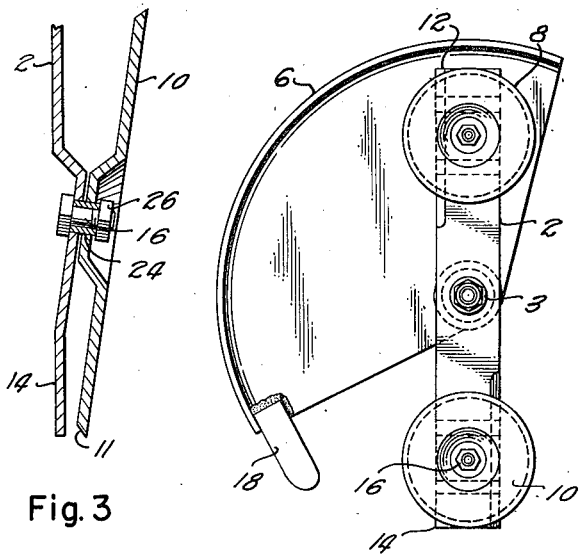
Fig.3
Fig.2
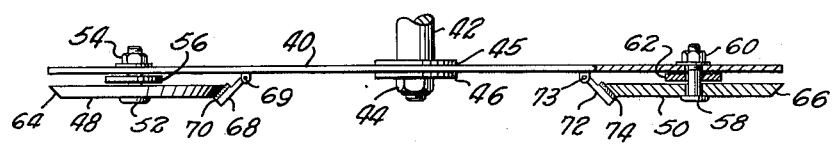
Fig.4
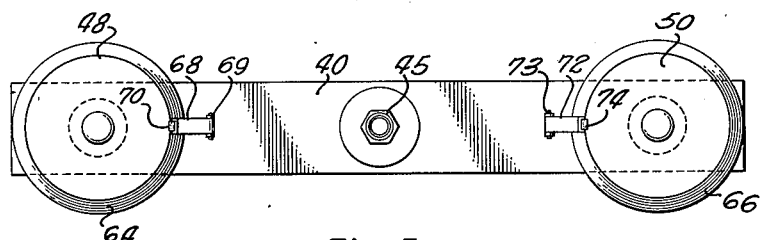
Fig.5
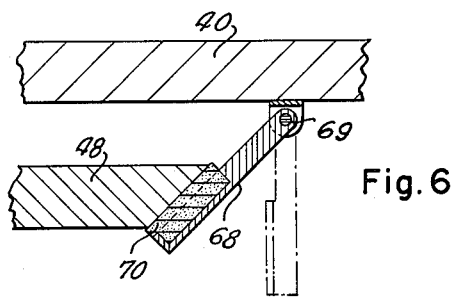
Fig.6
INVENTOR
Jacque K. Gallion
BY
ATTORNEY

United States Patent Office 3,217,812
Patented Nov. 16, 1965

3,217,812
CUTTER BLADE FOR EDGERS AND LAWNMOWERS
Jacque K. Gallion, 1410 S. Oak Cliff Blvd., Dallas, Tex.
Filed Jan. 9, 1964, Ser. No. 336,780
10 Claims. (Cl. 172—16)

The present invention relates to an improved cutter blade for edgers and lawnmowers.

Presently available cutter blades for edgers and lawnmowers are generally characterized by the inherent disadvantages of becoming dull after extensive use and an insufficient cutting surface and cutting action. The more popular edgers and lawnmowers are generally equipped with a single blade extending on either side of the rotating axis with the cutting action being provided only by the outer extremities of the blade. Consequently, the length of the actual cutting surface is small (usually in the order of 3 to 5 inches), in addition to which the movement of the rotating blade across the grass provides the cutting action. Moreover, sharpening of the blade requires a time consuming hand or machine operation.

The cutter blade of the present invention is characterized by a greatly increased length of cutting surface over conventional blades by a much improved cutting action, and in one embodiment, is further characterized by a self-sharpening feature. Briefly, the blade of the invention comprises a rotatable support member similar to a conventional blade, and includes a circular cutting disk at each end of the support member. The cutting disks rotate relative to the support member as the latter is made to rotate because of centrifugal force and the grass striking the cutting disks. Thus a much larger cutting surface is provided, in addition to which a much more effective action is achieved due to the increased rotation of the disks over that of the support member.

Other objects, advantages and features will become readily apparent from the following detailed description when taken in conjunction with the appended claims and the attached drawing wherein like reference numerals refer to like parts throughout the several figures, and in which:

FIGURE 1 is a front elevational view, partly in section, of a cutter blade according to the present invention adapted to be used with a lawn edger;

FIGURE 2 is a side elevational view of the cutter blade shown in FIGURE 1;

FIGURE 3 is an enlarged elevational view in section of the improved cutting disk of the blade of the present invention adapted for providing a V-shaped trench when used on a lawn edger;

FIGURE 4 is a side elevational view, partly in section, of an improved cutter blade according to the present invention adapted to be used on a lawnmower, which includes a self-sharpening feature;

FIGURE 5 is a bottom view of the blade shown in FIGURE 4; and

FIGURE 6 is an enlarged view of the self-sharpening feature of FIGURE 4.

Referring now to FIGURES 1–2, a support member 2 is mounted for rotation on a drive 4 of a conventional edger within a housing 6. Cutting disks 8 and 10 are mounted at the respective ends of the support member by any suitable means, such as a bolt 16 and nut 26 inserted through a bushing 24, such that the cutting disks can freely rotate about the axis defined by the bolt 16. The support member is preferably recessed at its ends so that the mounting bolts do not protrude beyond the support surface. As will be seen hereinafter, it is not necessary that the support member 2 be sharpened, although additional cutting action can be provided by sharpening the support member. The cutting disks are recessed similar to the support member such that the bolt 16 does not extend beyond the cutting edge of the disks. The disks 8 and 10 are sharpened along their edges 9 and 11 to provide the cutting action. As the support member is made to rotate, the cutting disks will rotate relative thereto as a result of the rotation of the support member and the cutting disks striking the earth and the grass. The relative rotation of the cutting disks provides a much improved cutting action over a conventional rotating blade. This can be seen from the fact that the cutting disks have a much increased length of cutting surface in addition to which the relative movement of the rotating disks through the grass is much greater than that of the rotating support member. In fact, the cutting surface of the rotating disks of the embodiment shown in FIGURES 1–2 can suitably be at least a factor 3 greater than the length of cutting surface of a conventional rotating blade.

It can be seen from FIGURES 1–2 that the separation between the cutting edge of the cutting disk and support member is effective to cut a trench 20, which prevents grass from growing adjacent the sidewalk. In the embodiment shown, a guide 18 is attached to the shield 6 and rests against the vertical wall 22 of the sidewalk to guide the edger as it is moved along the sidewalk.

The enlarged view of the FIGURE 3 more clearly shows the bushing 24, bolt 16 and nut 26 which is used to mount the cutting disk to the support member so that the cutting disk can rotate freely relative to the support member. However, provision of the bushing is not essential as the disk can rotate on the bolt 16 satisfactorily. Also, if desired, a spacer (not shown) can be utilized for providing the desired amount of spacing between the disk and the support member to cut a trench of the desired width. Moreover, FIGURE 3 illustrates the manner in which each of the disks can be positioned to rotate in respective planes at an angle to the plane in which support member 2 rotates to provide a V-shaped trench.

Another embodiment of the invention is shown in FIGURES 4–6, and is adapted to be used as the cutting blade of a lawnmower. Again, a support member 40 is mounted for rotation about a drive shaft 42 by means of a nut 44 with washers 45 and 46. Cutting disks 48 and 50 are mounted at the respective ends of the support member through bolt 52 and nut 54 and bolt 58 and nut 60, respectively. A spacer 56 is provided between the cutting disk 48 and the support member 40 and, similarly, a spacer 62 is provided between the cutting disk 60 and the support blade 40. These spacers serve the purpose of maintaining a desired separation between the cutting disk and the support blade and can be comprised of any suitable material, such as metal or nylon, as examples. As described in the other embodiment, the cutting disks are mounted so that they can freely rotate upon striking the grass and due to the rotating motion of the support member. As shown in FIGURE 4, the cutting disks are sharpened at their edges 64 and 66, respectively, to provide the cutting action. The relative rotation of the cutting disks is caused in the same manner as previously described. Since only the outer portions of a conventional lawnmower blade are effective in providing cutting action, the cutting action of the improved blade of FIGURE 5 is greatly increased as a result of the cutting disks.

In the embodiment shown, each cutting disk is provided with a sharpening attachment, whereby an arm 68 is mounted to a pivot 69 attached to the support member and has an abrasive sharpening surface 70 provided for sharpening the cutting disk 48 and, similarly, an arm 72 is mounted to a pivot 73 attached to the support member and has an abrasive sharpening surface 74 provided for sharpening the cutting disk 50. The sharpening attachment is shown in an enlarged view in FIGURE 6, in which it can be seen that the sharpening arms are free to rotate about the pivots in vertical planes and hang vertically when the support member 40 is at rest. As the support member is caused to rotate, the arms move up against the cutting edges of the cutting disks as a result of centrifugal force. The sharpening attachment is shown partially in section where it can be seen that a piece of Carborundum 70 or other sharpening material is mounted in a groove within the arm 68 to provide the sharpening action.

The embodiment just described for use on a lawnmower provides the same desirable features as does the edger in that a much increased surface area for cutting is provided in addition to the increased cutting action provided by the relative rotation of the cutting disk with respect to the rotating support member 40. Moreover, the sharpening feature obviates the necessity of the time consuming hand or machine sharpening required of conventional lawnmowers and insures that the cutting surfaces will remain sharp.

Although the invention has been described with regard to preferred embodiments, many changes and modifications will be obvious to those skilled in the art and thus the invention is not to be limited to what is shown herein, but only as necessitated by the scope of the appended claims.

What is claimed is:

1. A cutter blade for attachment to a lawn edging machine comprising:
    (a) a support member for being attached at its median point to a rotating shaft for rotation therewith and defining a pair of oppositely extending elongated portions which rotate in a first plane perpendicular to said rotating shaft;
    (b) first and second disk members each including a planar portion having a sharpened circular peripheral cutting edge; and
    (c) means for rotatably connecting said first and second disk members to said pair of elongated portions, respectively, at substantially equally spaced locations from said median point with each of said first and second disk members being free to rotate relative to said support member about a respective axis disposed at an angle to the plane of rotation of said support member;
    (d) each of said pair of elongated portions being indented toward said disk members and each of said disk members being indented toward said elongated portions at the point of attachment whereby said disk members are spaced apart from said first plane;
    (e) each of said elongated portions being terminated at a distance from said median point approximately opposite the periphery of its associated disk member.

2. A cutter blade as defined in claim 1 wherein each of said disk members rotate in a plane substantially parallel to but spaced apart from the plane in which said support member rotates.

3. A cutter blade as defined in claim 1 wherein each of said disk members rotate in respective planes disposed at an acute angle to the plane in which said support member rotates with the periphery of each of said disk members being closest to the respective elongated portions at the ends of said elongated portions.

4. A cutter blade as defined in claim 1 wherein the disk members rotate in second and third planes respectively, said second and third planes being oblique to said first plane and intersecting said first plane at points beyond the ends of said elongated portions.

5. A cutter blade for attachment to a lawn edging machine comprising:
    (a) a support member for being attached at its median point to a rotating shaft for rotation therewith and defining a pair of oppositely extending elongated portions which rotate in a first plane perpendicular to said rotating shaft;
    (b) first and second disk members each having a sharpened circular peripheral cutting edge;
    (c) each of said disk members having a centrally disposed hole passing therethrough and being indented at its center portion whereby said hole passes through a substantially flat portion lying in a plane spaced apart from but substantially parallel to the plane of its cutting edge;
    (d) means for rotatably connecting said first and second disk members to said pair of elongated portions, respectively, at substantially equally spaced locations from said median point and including shaft means adapted to pass through the hole in the associated disk member;
    (e) said disk members when attached to said support member being spaced apart from said first plane;
    (f) each of said pair of elongated portions being indented toward said disk member and substantially flat at the point of attachment;
    (g) each of said elongated portions being terminated at a distance from said median point approximately opposite the periphery of the respective disk members;
    (h) the point on the peripheral cutting edge of the respective disk member approximately opposite the end of the associated elongated portions being at least as close to said first plane as any other point on said cutting edge.

6. A cutter blade as defined in claim 5 wherein each of said elongated portions at the point of attachment is indented to form a flat surface oblique to and spaced apart from said first plane.

7. A cutter blade as defined in claim 5 wherein each of said elongated portions at the point of attachment is indented to form a flat surface substantially parallel to and spaced apart from said first plane.

8. A cutter blade for attachment to a lawn edging machine comprising:
    (a) a support member for being attached at its median point to a rotating shaft for rotation therewith and defining a pair of oppositely extending elongated portions which rotate in a first plane perpendicular to said rotating shaft;
    (b) first and second disk members each including a planar portion having a sharpened circular peripheral cutting edge; and
    (c) means for rotatably connecting said first and second disk members to said pair of elongated portions, respectively, at substantially equally spaced locations from said median point;
    (d) each of said first and second disk members being free to rotate relative to said support member about a respective axis disposed at an angle to the plane of rotation of said support member;
    (e) each of said pair of elongated portions being indented toward said disk members at the point of attachment of said disk member whereby said disk members are spaced apart from said first plane;
    (f) the planar portions of said first and second disk members each rotating in respective second and third planes, said second and third planes each forming an acute angle with the first plane in which said support member rotates with said second and third planes and each intersecting the first plane at points beyond the ends of said elongated portions.

9. A cutter blade as defined in claim 8 wherein said first and second disk members are each recessed toward said support member at the point of attachment.

10. A cutter blade as defined in claim 8 wherein said elongated portions terminate at a distance from said median point approximately opposite the periphery of the disk member attached thereto.

(References on following page)

References Cited by the Examiner

UNITED STATES PATENTS

| | | | |
|---|---|---|---|
| 833,392 | 10/1906 | Hudson | 172—91 |
| 925,768 | 6/1909 | Gesche | 172—91 X |
| 2,194,617 | 3/1940 | Scott | 56—245 X |
| 2,489,730 | 11/1949 | Soenksen. | |
| 2,592,755 | 4/1952 | Soenksen | 56—295 |
| 2,718,743 | 9/1955 | Smith et al. | 56—256 X |
| 2,737,105 | 3/1956 | Wilson | 172—15 |
| 2,740,249 | 4/1956 | Stearns | 56—295 |
| 2,898,725 | 8/1959 | Roesel | 56—295 |
| 2,902,097 | 9/1959 | Cairns | 172—15 |
| 2,998,082 | 8/1961 | Arnot | 172—42 X |
| 3,055,438 | 9/1962 | Wood et al. | 172—15 |
| 3,140,575 | 7/1964 | Ott et al. | 56—295 |
| 3,152,431 | 10/1964 | Ott et al. | 56—295 X |

ABRAHAM G. STONE, *Primary Examiner.*